United States Patent Office 2,952,676
Patented Sept. 13, 1960

2,952,676

17α - CARBOXYALKYL - 17β - HYDROXYANDROSTAN-3-ONE LACTONES AND NOR COMPOUNDS CORRESPONDING

John A. Cella, Skokie, Ill., assignor to G. D. Searle & Co., Chicago, Ill., a corporation of Delaware No Drawing. Filed Feb. 9, 1959, Ser. No. 791,839

7 Claims. (Cl. 260—239.57)

This invention relates to 17α-carboxy(ethyl and propyl)-17β-hydroxyandrostan-3-one lactones, nor compounds corresponding, and processes for the manufacture thereof. More particularly, this invention relates to products of the formula

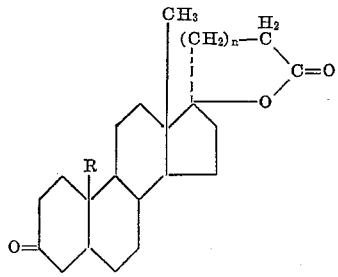

wherein R represents either hydrogen or a methyl radical and $n$ is a positive integer amounting to less than 3.

Equivalent to the foregoing lactones for purposes of the present invention are the corresponding hydroxy acids and their alkali salts, of the formula

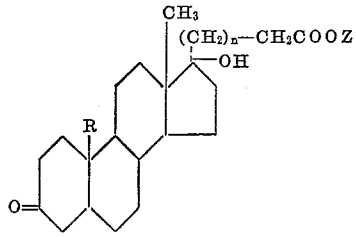

wherein R and $n$ are defined as before and Z is hydrogen, an alkali metal, or the ammonium radical.

The application for Letters Patent securing the invention herein described and claimed is a continuation-in-part of applicant's prior copending application, Serial No. 704,252, filed December 23, 1957, and now abandoned.

Lactones, hydroxy acids, and salts hereinabove described are useful because of their valuable pharmacological properties. Especially, the subject compositions are potent antihormonal agents. For example, they inhibit the effect of mineralocorticoids on urinary sodium and potassium, counteract cortisone-induced susceptibility to infection, and prevent the response of the male sex organs to androgens such as testosterone. Still further, the described products are barbiturate potentiators.

Manufacture of the compositions hereinafter claimed proceeds by hydrogenation of the corresponding Δ⁴ compound in the presence of a noble metal catalyst such as palladium—preferably, distributed and supported on charcoal, calcium carbonate, or the equivalent. Those skilled in the art will readily appreciate that the lactones hereof, on contact with aqueous alkali, are converted to salts of the corresponding hydroxy acids, from which the free acids can be obtained by a critically brief exposure to a proton source. Prolongation of the exposure time induces lactonization.

The following examples describe in detail certain of the compounds illustrative of the present invention, and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of material in parts by weight, except as otherwise noted.

Example 1

17α-(2-carboxyethyl) - 17β - hydroxy-5α-androstan-3-one lactone and 17α-(2-carboxyethyl)-17β-hydroxy-5β-androstan-3-one lactone.—A solution of 5 parts of 17α-(2-carboxyethyl)-17β-hydroxyandrost-4-en-3-one lactone (obtained from 17α-ethynyl-5-androsten-3β,17β-diol via Grignard carboxylation, saturation of the ethynyl linkage with hydrogen catalyzed by palladium, and Oppenauer oxidation of the 3-hydroxyl, as detailed in United States Patent No. 2,705,712) in 110 parts of ethyl acetate is subjected to the action of hydrogen at atmospheric pressures and room temperatures in the presence of 1 part of 5% palladium/charcoal catalyst. When one equivalent of hydrogen is absorbed, hydrogen uptake ceases. The catalyst is removed by filtration and the filtrate evaporated to dryness at substantially room temperature under nitrogen. The residue is chromatographed on silica gel, using benzene and ethyl acetate as developing solvents. From an eluate comprising 10% ethyl acetate, there is obtained pure 17α-(2-carboxyethyl)-17β-hydroxy-5α-androstan-3-one lactone, which melts at 177–179° C. This product has the formula

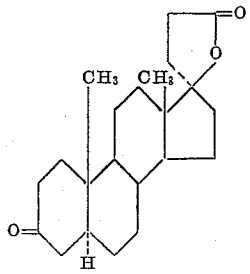

Also obtained in a 10% ethyl acetate eluate, but adsorbed somewhat more firmly on the silica gel than the corresponding 5α isomer, is 17α-(2-carboxyethyl)-17β-hydroxy-5β-androstan-3-one lactone, the melting point of which is 183–185° C.

Example 2

17α-(2-carboxyethyl)-17β-hydroxy - 19 - nor-5α-androstan - 3 - one lactone and 17α-(2-carboxyethyl)-17β-hydroxy - 19 - nor-5β-androstan-3-one lactone.—Using the technique of the foregoing Example 1, but substituting 17α-(2-carboxyethyl)-17β-hydroxy - 19 - norandrost-4-en-3 - one lactone (obtained from 17α - ethynylestradiol 3-methyl ether via Grignard carboxylation, reduction with lithium in a mixture of liquid ammonia and t-butyl alcohol, and treatment with mineral acid, as detailed in the application for United States patent Serial No. 680,659, filed August 28, 1957, and now forfeited) for the 17α-(2-carboxyethyl) - 17β - hydroxyandrost-4-en-3-one lactone called for therein, there is obtained 17α-(2-carboxyethyl)-17β-hydroxy-19-nor-5α-androstan-3-one lactone, melting at 198–201° C., and 17α-(2-carboxyethyl)-17β-hydroxy- 19-nor-5β-androstan-3-one lactone, melting at 218–222° C. The 5α isomer has the formula

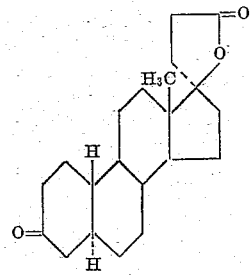

Example 3

A. *17α - (3 - carboxypropargyl)androst-5-ene-3β,17β-diol.*—A solution of 9 parts of 17α-propargylandrost-5-ene-3β,17β-diol in 90 parts of purified tetrahydrofuran is added, with agitation during a 5-minute period, to a solution of 35 parts of methylmagnesium bromide in 180 parts of purified tetrahydrofuran. The resultant mixture is heated to the boiling point under reflux and maintained thereat with continued agitation for 24 hours, at which point the mixture is vigorously agitated in a carbon dioxide atmosphere for an additional 24 hours. The mixture is then hydrolyzed with ice-cold aqueous 3% sulfuric acid, following which it is extracted with ether. Solvent is removed from the ether extract by evaporation, and the residue is suspended in 90 parts of boiling chloroform for 5 minutes. The material which remains undissolved is 17α(3-carboxypropargyl)androst - 5 - ene-3β,17β-diol. The product, recovered by filtration, melts at 203–206° (with decomposition) and has the formula

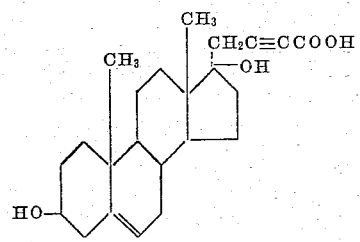

B. *17α-(3-carboxyallyl)androst - 5 - ene - 3β,17β - diol lactone.*—A solution of 6 parts of 17α-(3-carboxypropargyl)androst-5-ene-3β,17β-diol in 60 parts of a 10% solution of pyridine in purified dioxane is maintained with agitation under hydrogen at atmospheric pressure in the presence of 2 parts of 5% palladium/calcium carbonate catalyst until hydrogen uptake indicates conversion of the ethynyl to a vinyl linkage. Catalyst is then filtered off and solvent removed from the filtrate by distillation. The thick yellow oil which remains is taken up in 50 parts of ethanol; and this solution is mixed for 3 minutes at room temperatures with 10 parts of concentrated hydrochloric acid, which mixture is then poured into 1000 parts of water. The material which precipitates is the desired 17α - (3 - carboxyallyl)androst-5-ene-3β,17β-diol lactone, which is collected on a filter, washed thereon with water, and dried in air. The product has the formula

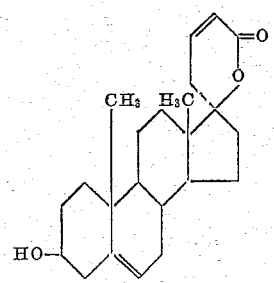

C. *17α-(3-carboxypropyl)androst - 5 - ene-3β,17β-diol lactone.*—To a solution of approximately 6 parts of 17α-(3-carboxyallyl)androst-5-ene-3β,17β-diol lactone in 80 parts of absolute ethanol is added 1 part of concentrated hydrochloric acid. The resultant material is maintained with agitation under hydrogen at atmospheric pressures in the presence of 1 part of 5% palladium/charcoal catalyst until hydrogen uptake indicates saturation of the vinyl linkage in the lactone ring. Catalyst is then removed by filtration, and the filtrate is reduced to a small volume by vacuum distillation. Upon dilution with water, a viscous yellow oil is precipitated. Extraction of the oil into chloroform and distillation of solvent from the chloroform extract affords the desired 17α-(3-carboxypropyl)androst-5-ene-3β,17β-diol lactone as a colorless "glass." The product has the formula

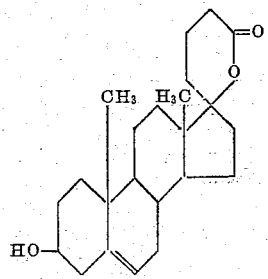

D. *17α - (3 - carboxypropyl) - 17β - hydroxyandrost-4-en-3-one lactone.*—A solution of 3 parts of aluminum isopropoxide in 35 parts of dry toluene is rapidly added, with agitation, to a boiling solution of 3 parts of 17α-(3-carboxypropyl)androst-5-ene-3β,17β-diol lactone and 15 parts of cyclohexanone in 90 parts of dry toluene under reflux. Agitation at the boiling point under reflux is maintained for 15 minutes, whereupon the mixture is cooled, diluted with water, and then steam distilled until the distillate is essentially clear. The distillation residue is cooled, acidified to pH 2 with hydrochloric acid, and thereupon extracted with ether. Evaporation of solvent from the ether extract affords as the residue a pale yellow gum which is purified by chromatography on silica gel, using benzene and ethyl acetate as developing solvents. From an eluate comprising 15% ethyl acetate, upon evaporation of solvent and recrystallization of the residue from a mixture of ethyl acetate and isopropyl ether, there is obtained the desired 17α-(3-carboxypropyl)-17β-hydroxyandrost-4-en-3-one lactone, melting at 192–193°. The product has the formula

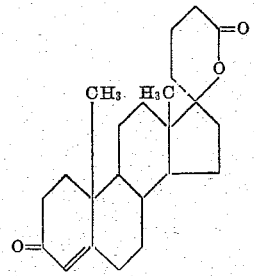

E. *17α - (3 - carboxypropyl) - 17β - hydroxy - 5α - androstan-3-one lactone and 17α-(3-carboxypropyl)-17β-hydroxy-5β-androstan-3-one lactone.*—A solution of 15 parts of 17α-(3-carboxypropyl)-17β-hydroxyandrost-4-en-3-one lactone in 160 parts of absolute ethanol is maintained, with agitation, under hydrogen at atmospheric pressures in the presence of 3 parts of 5% palladium/charcoal catalyst until hydrogen uptake indicates that reduction of the 4,5-double bond is complete. Catalyst is then removed by filtration, and the filtrate is stripped of solvent by distillation. The clear colorless glass obtained as a residue is chromatographed on silica gel, using benzene and ethyl acetate as developing solvent. From an early eluate comprising 10% ethyl acetate, on evaporation of solvent and recrystallization of the residue from a mixture of ethyl acetate and isopropyl ether, fine white needles of 17α-(3-carboxypropyl)-17β-hydroxy-5α-androstan-3-one lactone, melting at 191–193°, are obtained. The product has the formula

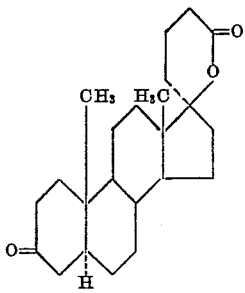

From a subsequent 10% ethyl acetate eluate, on evaporation of solvent and recrystallization of the residue from a mixture of ethyl acetate and isopropyl ether, small dense cubes of 17α-(3-carboxypropyl)-17β-hydroxy-5β-androstan-3-one lactone, melting at 196–197°, are obtained. This product has the formula

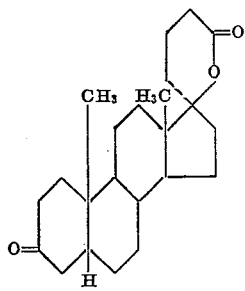

Mixed melting point determinations confirm the dissimilarity of the products of Examples 3D and 3E.

What is claimed is:
1. A compound of the formula wherein R is selected from the group consisting of hydrogen and the methyl radical, and $n$ is a positive integer amounting to less than 3.

2. 17α - (2 - carboxyethyl) - 17β - hydroxy - 5α -androstan-3-one lactone.
3. 17α - (2 - carboxyethyl) - 17β - hydroxy - 5β - androstan-3-one lactone.
4. 17α - (2 - carboxyethyl) - 17β - hydroxy - 19 - nor-5α-androstan-3-one lactone.
5. 17α - (2 - carboxyethyl) - 17β - hydroxy - 19 - nor-5β-androstan-3-one lactone.
6. 17α - (3 - carboxypropyl) - 17β - hydroxy - 5α - androstan-3-one lactone.
7. 17α - (3 - carboxypropyl) - 17β - hydroxy - 5β - androstan-3-one lactone.

References Cited in the file of this patent
UNITED STATES PATENTS

| | | |
|---|---|---|
| 2,361,968 | Ruzicka | Nov. 7, 1944 |
| 2,705,712 | Cella | Apr. 5, 1955 |